Jan. 6, 1953         W. D. FOSTER         2,624,233
FILM HANDLING APPARATUS AND MAGAZINE FOR
USE THEREWITH AND CONTROL THEREOF
Original Filed May 18, 1944                 3 Sheets-Sheet 1

INVENTOR
Warren Dunlap Foster
BY

ATTORNEY

*INVENTOR.*
WARREN DUNHAM FOSTER

Patented Jan. 6, 1953

2,624,233

UNITED STATES PATENT OFFICE 2,624,233

FILM HANDLING APPARATUS AND MAGAZINE FOR USE THEREWITH AND CONTROL THEREOF

Warren Dunham Foster, Eustis, Fla., assignor to Foster and Foster, Ridgewood, N. J., a copartnership Original application May 18, 1944, Serial No. 536,128, now Patent No. 2,462,083, dated February 22, 1949. Divided and this application February 21, 1949, Serial No. 77,666

43 Claims. (Cl. 88—17)

My invention may be particularly applied to motion picture and other film handling and photographic apparatus for use by amateurs but its utility is not so limited. I am illustrating my invention in connection with a magazine and camera but in certain of its phases my invention can be used in any apparatus and its magazine for the projection or exposure or printing of pictures or of images representing sound.

This application is a division of my co-pending application, Serial Number 536,128, filed May 18, 1944, and issued February 22, 1949, as Patent Number 2,462,083. That parent patent in turn is a continuation-in-part of Patent Number 2,391,497, dated December 25, 1945, upon an application of Oliver Whitwell Wilson and myself filed September 1, 1943, which in turn is a continuation-in-part of an application filed by the said Wilston and myself September 21, 1940, which upon June 13, 1944, matured as Patent Number 2,351,088. In my said patent which is the direct parent hereof I apply my invention to two magazines, apparatus for use therewith, and the combination thereof. In one, the magazine has an open recess across which a film passes for exposure or projection as described and claimed by George William Ford in his United States Patent Number 1,944,023, dated January 16, 1934, and in various improvements thereover by this inventor, myself and others associated with him and with me, including the highly developed Morsbach magazine and apparatus which is perhaps best illustrated by his United States Patents Number 2,175,538, dated October 10, 1939, and Number 2,159,998, dated May 30, 1939. In another, I present an entirely novel magazine, apparatus for use therewith, and the combination thereof in which a closed recess is provided adjacent one edge wall of a magazine in which a presser gate member is disposed which is completely inert until resilience is provided by the apparatus. For such open recess in my said parent patent and for other uses I describe and claim a novel tubular light trap which protects both sides of the film. For use with the magazine with a closed recess or with one without a recess I present therein a single blade light shutter. In each case I claim means for moving the light trap from and to its position across such recess or opposite the lens of the apparatus by automatic means interlocked with the operation of a presser gate member and effective in sequential or other timed relation. Other related subject matter is included within the description and claims of said parent patent.

The present application discloses and claims joint operation of a light trap, whether of a single blade or double, and mechanism for stopping, starting, blocking or freeing the operation of a film feeding mechanism, and the foregoing elements, in various combinations. Also included are improved devices whereby a light trap is operated by the latching or unlatching of a cover of a film handling apparatus. The foregoing control system also embodies interlocking actuating connections with other operable parts of the apparatus. An important object of this invention is to present a magazine having a light trap which is removed from operative or protective position by a control member of an apparatus with which it is used, but automatically returned thereto by the first portion of an act of removing it from its receptacle within the apparatus.

According to one form of the invention claimed herein a light-obscuring shutter of a magazine is moved from light-obscuring position by the starting of a spring motor which drives a pull-down and returned to protective position when it stops. Alternatively one of these operations of a light trap is carried out by relative movement between the magazine and its receptacle. Also, according to this invention, operation of a pull-down is positively blocked by a member which is removed from and returned to blocking position by the same external control member which operates the light trap, the pull-down (and also its associated positioning claw) always coming to rest in a position wherein it does not interfere with a light shutter of a magazine. Particularly but not exclusively for use with the first of the two mechanisms described immediately above a presser or other gate plate is cammed away from the film by an element carried by or formed with the light trap so that the light trap may be moved from or to operative position while the gate is still closed. Preferably but not necessarily, the foregoing control mechanism, which includes the control of an intermittent feeding member, is interlocked with the movement of a presser member from and to operable position or the imparting of resilience to a novel gate member which is disposed in the novel closed recess of my parent patent. Although I am illustrating my invention as applied to magazines having recesses, open or closed, those skilled in this art will readily understand that it is equally applicable to magazines in which one gate plate is mounted therein, such for example as my Patent Number 2,277,695, dated March 31, 1944, or in which both gate plates are disposed therein, such, for one example only, as the co-pending application of Sigrid Foster and myself, Serial Number 51,888, filed September 30, 1948.

Another object of this invention is to provide improved mechanism for mounting, guiding and controlling a light-trap for a film magazine and the parts associated therewith, as well as improvements in a light trap per se, particularly for cooperation with associated parts but not so limited.

Among the important objects of this invention is the provision of devices, mechanisms and combinations such as those outlined above. Also included among these objects is the presentation of improved mechanism whereby the operation of a latch of a magazine-enclosing receptacle operates a light-trap. Other objects, advantages and characteristics will be evident from the following portion of this specification, the accompanying drawings and the subjoined claims. Although I am showing preferred forms only of my invention for purposes of illustration, it will be understood that changes can readily be made without departing from the scope of my broader claims or the spirit of my invention.

In the drawings:

Figure 18 shows an alternative form of tubular light trap which embodies both top and bottom edge guides for a film passing therethrough and is operated by a cup, or motion transmitting member of substantial height.

For clarity and simplicity certain terminology is used uniformally in the following specification and in the subjoined claims. The "front" of a magazine or a part thereof is that portion thereof which is disposed toward a lens of a camera or other film handling apparatus when the magazine is in use. "Side" walls are the parallel broad and flat walls of a protective container of a magazine, while "edge" walls are the narrow walls connecting the side walls and holding them in spaced parallelism and completing the enclosure of the container. "Top" (or "upper") as applied to an edge wall is that portion which is uppermost and horizontal when the camera and magazine are held in usual picture-taking position. As applied to a side wall, it is the wall more distant from the drive and closer to the cover in usual constructions. "Bottom" (or "lower") as applied to a side wall is that side wall which is closer to a drive when the magazine is in its receptacle in a camera of usual construction. In describing a magazine gate the orientation of the side walls is employed. As applied to an edge wall "bottom" is the one which is lower when a picture is being taken or projected with the apparatus in its usual position.

The orientation of a film is in accordance with the above terms. Thus a "front side" of a film is that which is nearer a front edge wall (and a lens when the magazine is in an apparatus) and an "upper edge" is that nearer an upper edge wall. Like terms are similarly employed.

Other objects of my invention are to provide apparatus of the types and accomplishing the results described above and illustrated in the above drawings.

I illustrate my invention as applied to a film handling apparatus, in this instance a camera of the well-known and widely used Morsbach type, but of course its application is not so limited. The said camera, and a magazine used therewith, is illustrated in Patent Number 2,175,538, granted October 10, 1939, the magazine alone being shown in Patent Number 2,159,998, dated May 30, 1939. This magazine is of the type having a recess over which a film extends and is an improvement in certain aspects over Patent Number 1,944,023, dated January 16, 1934, to Ford. Although illustrated as applied to such recessed magazines and to that claimed in the parent hereof my invention is equally useful wherein one or both gate sections are disposed within a magazine.

Figure 1:
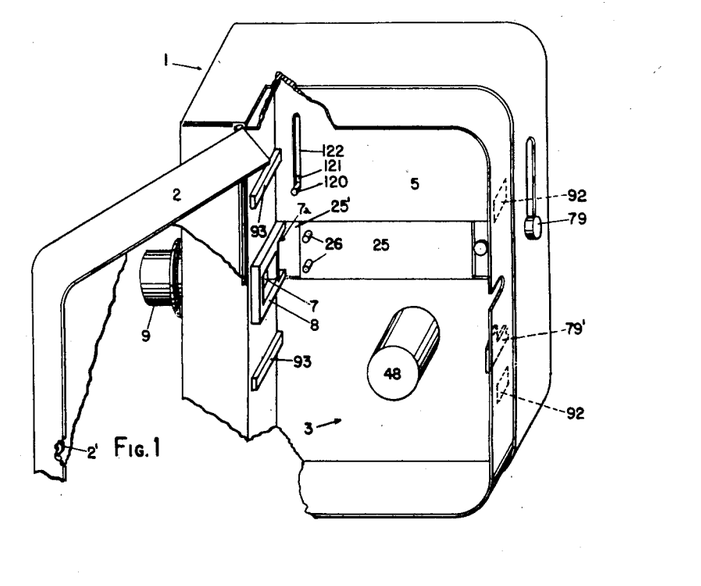
Figure 1 is an isometric view of a camera shown generally as of the Morsbach type which illustrates a magazine-receiving receptacle of a camera together with actuating mechanism operated by a latch and operating devices for a gate of the type of my parent patent which is particularly well adapted with a light trap of the type illustrated in Figures 18, 19 and 20.

The camera may consist of a substantially rectangular casing 1 with a hinged cover 2, having a latching member 2', which closes a magazine receiving compartment 3 into which a user may insert a magazine M or M'. Within the casing are two bearing plates which make up a main frame, one 4, (Figure 6) which is disposed adjacent the floor 5 of the compartment and another 6 positioned within the interior of the casing. If desired, the plate 4 may also serve as the floor and a separate floor omitted.

A film f mounted within a magazine is drawn past an exposure window or aperture 7 by a claw 7a. This window is formed in a fixed gate plate or gate section 8 which projects backwardly from a lens 9 and into the film receiving compartment and defines the focal plane of the film. Location of this plane is highly critical. The distance between it and the lens must be established and maintained with very great accuracy since the focus of the instrument is determined thereby, as is well known to all skilled practitioners in this art.

Figure 2:
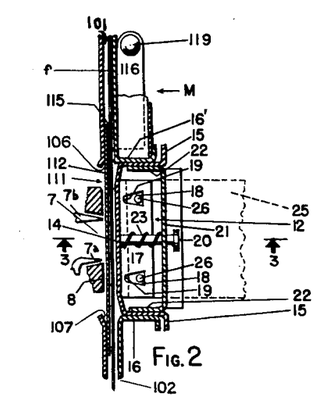
Figure 2 is an enlarged vertical sectional view of a light trap and gate of a magazine especially adapted to cooperate with a camera of Figure 1.

A movable gate section with which my light trap is used and with which it preferably but not necessarily is jointly controlled must first be described. This movable gate section as illustrated in Figure 2 and claimed in my said parent application consists of a plurality of co-operating members some mounted upon a magazine and some upon an apparatus but with those upon the apparatus operating and controlling those upon the magazine. As is clearly shown in Figures 1 and 2, upon the forward side of the magazine M and adjacent the inner portion of a closed recess 12 over which a film f passes I mount a main magazine gate plate which comprises a forward portion or presser element 14 in actual engagement with a film, two lips or flanges 15 which extend backwardly therefrom and are disposed about the adjacent edges of two light trapping shields 16 and also a backwardly turned lip 17 which is positioned adjacent the bottom of the recess and parallel to its plane. This plate is preferably formed from one piece. This lip 17 includes two irregularly shaped openings 18 for co-action with a gate controlling and positioning mechanism which is disposed upon the camera. These openings are roughly triangular in shape with the apex of each in the form of an arc 19 positioned forwardly or relatively adjacent the film. This main plate although disposed within a magazine and supported inertly thereby when the magazine is not positioned within a camera is both actively supported and critically positioned by the camera when it is in assembled relation thereto. It may be so supported and controlled by the camera as shown in Figures 1 and 2, as later described.

In the form of my invention shown in Figure 2, a headed pin 20 is fixed to the side of the presser portion 14 of the gate opposite that engaging the film and extends backwardly and through an over sized opening in a supporting plate 21 and is freely movable relatively thereto. This plate is mounted upon the floor of the magazine M and extends away therefrom toward the cover thereof in a direction normal thereto. Lips 22 extend forwardly within the backwardly turned flanges 15 of the film contacting element thus protecting the adjacent side of the film from light. The movable presser plate, it will be understood, is freely movable relatively to plate 21. A spring 23 coiled about pin 20 presses film contacting elements 14 toward the film. Preferred shapes of these various elements will be clear from a consideration of Figure 2.

Devices to operate and control this gate section are disposed upon the camera. They include a gate supporting bracket 25 preferably but not necessarily formed with a forward portion 24 (Figure 6) slightly offset upwardly and mounted in a suitable depression 25' in the floor of the magazine compartment and parallel to said floor and controlled by mechanism later described which also controls a light trap, according to certain phases of this invention.

Mounted upon and extending outwardly from the forward preferably slightly raised end 24 of the plate 25 are two upstanding pins 26 the dimensions of which are such that they fit relatively snugly in the extreme forward portions 19 of the openings previously described but loosely within the rearward portions thereof. As a user drops the magazine into position within the camera the pins 26 irrespective of slight manufacturing inaccuracy or reasonable damage to the external portions of the magazine are positioned within the relatively large portions of the openings 18 relatively distant from the film. As the bracket 25 is moved forwardly toward gate closing position and closer to the film by means later described the pins 26 find their way into the rounded forward extremities 19 of the lip 17 thus accurately positioning the film contacting element 14 in relation to the apertured gate plate 8 which is fixed upon the apparatus. Plate 17, previously supported by the floor of the magazine, now rests upon raised portion 24 of the bracket, in which, if desired, slight ridges not shown may be formed parallel to the optical axis to reduce frictional contact. Alternatively posts 26 may be formed with cross bars, not shown, upon which lip 17 may be supported when the magazine is in the camera. Thereupon the gate is closed ready for a film carried by the magazine to be fed therethrough.

Means for operating the pull-down claw 7a to feed a film through the gate will now be described. These means are blocked in timed relation to the operation of this gate section and the light trap.

Driving mechanism of the camera (see Figure 9) may consist of a coiled spring not shown housed within a cylindrical casing 27 which is mounted upon or attached to a driving gear 28. This spring is fixed to a shaft 29 and is wound by a handle not shown and held against unwanted unwinding by a ratchet and pawl or other suitable or conventional means not shown. Gear 28 meshes with and drives a gear 30 which is coaxial with and attached to gear 31. Gear 31 operates gear 32 with which gear 33 is movable. Gear 33 in turn meshes with gear 34 which is attached to and coaxial with gear 35 which through a gear 36 operates an intermittent movement driving disc 37 which is attached thereto.

Figures 5, 6, 7:
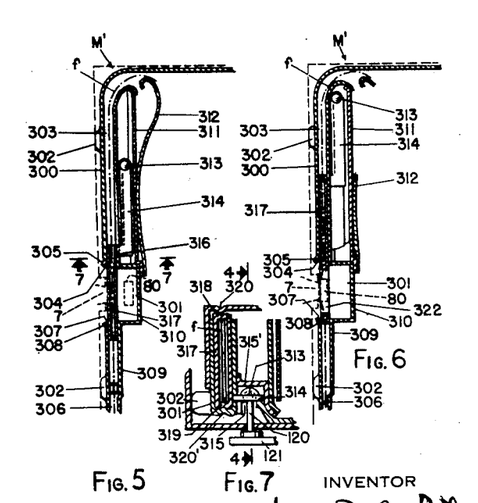
Figure 5 (sheet one) is a vertical section of a magazine showing a double or tubular light trap of a type claimed per se in my parent patent in closed or protective position with a pin and cup control mechanism operated by a latch such as that shown in Figure 1.
Figure 6 corresponds to Figure 5 but shows the parts in open or running position.
Figure 7 is an enlarged section taken on the line 7—7 of Figure 5 and looking in the direction of the arrows.

This disc 37 drives the feeding claw or tooth 7a which intermittently feeds forwardly a film f, disposed in magazine M or M' after it has been placed within the camera. This claw is mounted on the end of a link 38 guided by a pin working in a curved slot 39 formed in an intermediate supporting plate 40. At its end opposite the tooth 7a the link 38 is pivotally connected to the free end of a short arm 41 which is mounted at its other end upon main driving disc 37. It will be seen that the revolution of disc 37 in a clockwise direction as shown in Figures 6 and 7 intermittently feeds the film forwardly.

A reciprocating shutter is driven in timed relation to the intermittent feeding member. A link 42 pivotally mounted upon the main driving disc 37 is guided at its upper end by means of a pin 43 working in a slot 44. Depending from this pin is a long shutter plate 45 with an opening not shown which in timed relation to the movement of the intermittent claw 7a alternately permits light from lens 9 to reach the film and cuts it off. This shutter is so timed that when the entire feeding mechanism is held inoperative between "shots" with the film at rest light can not reach the film. I may provide a positioning member or finger 7b (Figure 8) which in any conventional or desired manner such as illustrated in said Morsbach Patent 2,175,538 may be driven from this mechanism.

A take-up member 48 revoluble with the gears 32 and 33 and hence driven by the spring winds up the film upon the take-up mass within the magazine. I may prefer to use a mechanism for releasably and frictionally coupling the member 48 to a coil within the magazine which is shown in the said patent to Morsbach et al. 2,175,538, but any desired or conventional means may be used.

To control the operation of the intermittent claw, shutter and take-up, the following mechanism may be employed.

Formed in the periphery of the driving disc 37 is projection 50 which is engageable with a dog 51 turned from the plane of the main portion of the lower end of control arm 53 and also with a dog 55 which is a part of the latching and control mechanism later described. This arm is pivotally mounted upon a stud 56 and held in position by a coiled spring 57 extending from the upper end of the arm to a pin 58 mounted upon plate 6.

Control mechanism for making a single exposure is not shown, but may be as disclosed in said Morsbach Patent 2,175,538 or in my United States Patent Number 2,206,032.

To operate the above control arm 53 and hence start and stop the film feeding mechanism, a disc 59 is provided. This disc is mounted for rotation upon a shaft 60 and moved between running and threading positions by a short strut or arm 61 which extends into a notch 64 in disc 59 from a control button 62 which is mounted upon the exterior of the case, the arm 61 working in an arcuate slot 63. Spring 57 holds control arm 61 in engagement with arm 61. Thus as the button is moved in a clockwise direction as shown in Figure 7 and from the position there shown, arm 53 will be rocked and projection 50 removed from dog 51 and the apparatus started.

When the button is released, the spring will return the parts to the position shown in Figure 7 and the apparatus will be stopped.

As previously pointed out, the complete unitary channel for the film, which includes my tubular light trap when it is used, comprises certain elements positioned upon the apparatus and others positioned upon the magazine. Film contacting surface 14, while a part of the movable gate section which is loosely supported by the magazine, is finally supported and positioned by the camera and moved into and away from its critical operative position by bracket 25. The magazine is dropped into place while this slide is in open or film threading position as shown in Figure 1. At this time after the magazine has been dropped into place but before the light trap has been withdrawn from protective position or the gate has been closed pins 26 are in the position shown in Figure 2 and the film has not been brought into the focal plane and is not under pressure from the film contacting surface of the presser plate. Thereafter the cover is closed and latched and by mechanism later described the slide moved forwardly so that pins 26 move into the arcuate forward extremities of their openings and the whole movable gate section is brought into running position. Spring 23, which is relatively very light, permits sufficient movement of the presser-plate to accommodate irregularities during the running of the film while maintaining the film pressed into critical relation to the focal plane in a manner generally considered necessary in this art. The unlatching of the cover of the apparatus, however, moves the gate supporting plate 25 backwardly to the position shown in Figure 1, releases the pressure upon the film and permits the movement of the light-trap back to protective position and the easy removal of the magazine from the apparatus. At this time, the film and the light-trap then associated therewith clear the fixed gate section and sufficient space is provided so that a light-trap has opportunity to operate whenever needed without conflict.

Except at such times as the gate is completely closed it is impossible to feed a film. As will be clear from Figures 8 and 9, the main driving disc 37 will be held immovable by engagement of the projection 50 by the dog 55 which is turned in the lower end of a control plate 71 if an attempt is made to start a feeding operation while the cover 2 is open and unlatched and, as will later appear, if the light-trap has not been removed from protective position. As shown in these figures, the film moving mechanism is held immovable by other and associated control devices which are used to stop and start a feeding operation of the film and to control a light-trap, if and as desired, as is later described in detail. If, however, while the disc 37 is free to revolve under the power of the spring as in a feeding operation, the latch is opened, projection 50 will be engaged by dog 55 before the feeding mechanism is permitted more than a small fractional portion of its revolution. At that time the parts will be in a position shown by Figure 2 of the said Morsbach Patent 2,175,538. It will, therefore, be seen that the movement of this control plate upwardly as viewed in the figures permits the film feeding mechanism to operate and that its movement therefrom to a downward position will block this feeding mechanism. Such control is additional to that exercised by the button 62 which starts and stops the pull-down. In certain forms of this invention a light-trap is controlled by the latch for the cover, in others by the starting and stopping button, and in still another in one movement by the button which controls the pull-down and in the other by contact with the apparatus.

Figure 8:
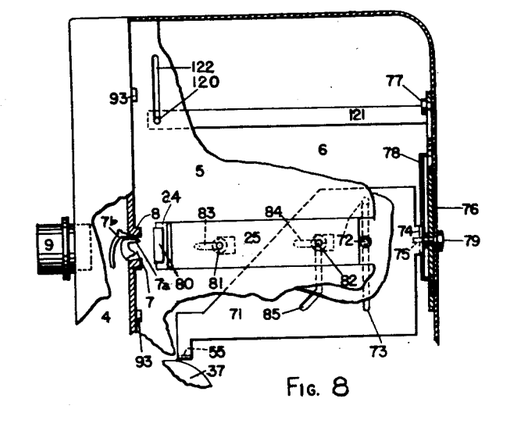
Figure 8 is a vertical sectional view of a camera showing control mechanism for a gate and light trap and a connection interlocking such mechanism with a block for a pull-down. The gate illustrated in this figure is of the Morsbach type which is particularly adapted for use with my double or tubular light trap, but control mechanism shown therein is equally applicable to either a double or single light trap and also to the novel gate structure of my parent patent or, so far as its blocking instrumentalities are concerned, to use with a magazine containing both gate sections.

This control plate is guided by a pin 72, operating in a slot 73, as will clearly be seen from Figure 8. Right-angled projection 74 struck in plate 71 coacts with a pin 75 mounted upon a latch control slide 76 guided by pins 77 projecting forwardly toward the interior of the camera from the back wall of the film receiving compartment and controlled by a wire spring 78. A button 79 extending to a point exterior of the camera for easy operation by a finger of a user operates the slide to which is attached a latch 79' for cooperation with member 2' on the cover, as will be seen from Figure 1.

Figure 8 illustrates a movable gate section 80 of the Morsbach type mounted upon a forward and upturned portion of slide or gate cover bracket 25 but whether a gate member of this type or my novel supporting mechanism is employed, the construction and operation of the slide may be unchanged, except in certain variants of my invention described and claimed in my parent patent. This bracket 25 may be guided by pins 81 and 82 working in slots 83 and 84 respectively. The pin 82 projects downwardly from this carrier bracket and engages slot 85 cut in control plate 71. An upward portion of the slot is straight while the lower portion is offset in order to form a camming surface. Thus a movement of the latch upwardly from the position shown in Figure 8 will force the carrier bracket forwardly so that the movable pressure plate or contacting surface 14 of the gate is brought against the fixed apertured plate 8 and the dog 55 removed from alignment with the projection 50 permitting the operation of the feeding mechanism. Thus as the gate is closed the operation of the camera is permitted.

To assist in the proper positioning of the magazine within its compartment, a spring not shown is disposed upon the cover 2 and leaf springs 92 upon the back wall of the compartment. Also small positioning blocks or projections 93 may extend backwardly from the front wall of the compartment or, alternatively, forwardly facing projections 302 (Figure 5) may be added to the forward edge of the magazine. As a result, the magazine, after it has been placed in position in its compartment and the cover closed, is forced into and maintained in operating position. The blocks or projections are effective to hold the magazine away from the front wall so that a light-trap and the inwardly projecting gate section 8 will clear each other as a magazine is being placed in or removed from operating relation to the apparatus.

Latching member 2' (Figure 1) provided upon the cover member 2 upon the closing thereof engages a corresponding member 79' mounted upon the slide 76 which is operated by the latch button 79. Thus when the cover is closed it is latched into position by the same movement of button 79 which releases the driving mechanism and moves the gate member into position, thus bringing the film into the focal plane, and, as later described in detail, retracts a light shield. On the contrary by the release of the latch the bracket and gate member carried thereby are moved backwardly, the channel at that point is widened, and the mechanism for feeding the film through the channel is rendered inoperative. Also, the light shield is brought back to protective position.

It will be noted that the upper portion of operating slot 85 is relatively long. Thus the latch button is permitted considerable movement before the gate is closed and after it is opened. As a consequence time is given for the operation of a light-trap, as later described, in the necessary sequential relation to the operation of the gate.

Having now described my novel gate structure, part of which is illustrated as carried by the magazine in a closed recess but operated by the apparatus, I shall next explain the application of my single bladed light-trap to such a magazine and its sequential operation with a further description of those other parts of the magazine which are necessary to a full understanding of the light-trap. Thereafter, I shall describe certain preferred modifications of my novel magazine gate structure and involving a magazine and a camera together with a light-trapping structure for use therewith. Thereafter, I shall present my novel tubular light-trap which is claimed in my parent patent. I illustrate it as applied to a Ford-Morsbach magazine with an open recess and operate in a manner similar to that in which I operate my single bladed light-trap. It should be understood, however, that I am not limited to the use of my novel light-trap with my novel control mechanism or vice versa.

As stated in the introductory portion of the specification, I may apply a single bladed light-trap to my novel magazine M which substitutes a closed recess for the open gate receiving recess of the Ford-Morsbach magazine. In this instance the closed recess which includes a portion of the gate, all as previously described, protects the rear side of the film from light and my single bladed light-trap protects the forward side. I may apply my tubular light-trap, however, to a magazine M' of the Morsbach type which is an improvement over the Ford magazine. Since the recess of this magazine is entirely open to light except upon the upward side it is necessary that I surround all sides of the film with a light protecting element. The control mechanism per se by which I operate each of these two different light-traps is substantially the same.

The parts of magazine M will now be described to the extent that such description is necessary for a full understanding of the invention claimed herein. Reference to my co-pending parent patent will make clear the entire structure. Claims to the structure of said magazine except in relation to certain details immediately associated with a light-trap as well as to my novel light-trap per se will be found in said parent patent.

A film f passes from a delivery support within a magazine, which may be constructed in accordance with my parent patent or said Morsbach or Ford patents, to a take-up support which is engageable with and driven by take-up member 43 previously described, the construction of said delivery and take-up supports being if desired in accordance with my said parent patent or of said Morsbach and Ford patents. A delivery channel 101 leads from a delivery coil to a closed gate receiving recess 12 while a take-up channel 102 leads therefrom toward the take-up. This take-up channel is bounded upon the side toward the interior of the magazine by L-shaped plate 16 previously described to the depending long leg of which is attached a channel forming and tensioning member of the Bundick and Proctor type which operates in accordance with principles described in their Patent 1,944,022 granted January 16, 1934, or in my Patent 1,975,782, granted October 9, 1934, wherein I apply said Bundick and Proctor tension control system of feeding to a magazine, or in the said Morsbach patents wherein such system so applied is shown and claimed in an improved form. Still further backwardly a plate, such as 311 in Figures 5 and 7, is provided parallel thereto which acts as a guide and light baffling member for an operating mechanism for my light-trap hereinafter described and also as a support for a delivery tensioning member of the Bundick and Proctor type shown in Figure 5 as 312. This construction of tensioning mechanism is more fully shown and described in my said parent Patent Number 2,462,083 dated February 22, 1949, and also in the patents noted herein as parent thereto. It will be noted that Figure 2 hereof in enlarged form shows the above construction as applied to a magazine having a closed recess and that Figures 5, 6 and 7 hereof show such mechanism at a reduced scale and applied to a camera having a gate plate 80 of the type shown in Figure 8 hereof. Similar mechanism fully shown in my parent patent is associated with the take-up coil. It should again be emphasized, however, that the inventive substance hereof is and can be applied as effectively and in some of its aspects perhaps even more effectively to magazines which include either one or both gate members whether conventional or of the novel type described and claimed in the co-pending application of Sigrid Foster and myself Serial Number 51,888, filed September 30, 1948.

Delivery channel 101 terminates in a mouth or aperture 106 above recess 12 while take-up channel 102 starts in a similar mouth or aperture 107 below this recess and in alignment with mouth 106. The forward walls of both body and cover of the magazine are flared forwardly respectively to accommodate more readily the slight forward bend which is given to the film when it is pressed forwardly into relation with fixed gate member 8, after the light-trap generally indicated as 111 has been removed from protective position.

Figure 3:
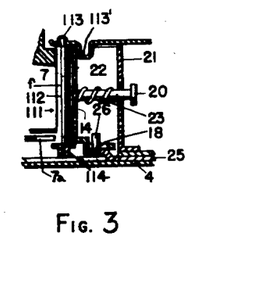
Figure 3 (sheet two) is a section taken on the lines 3—3 of Figures 2 and 10 and looking in the direction of the arrows.

This single bladed light-trap consists essentially of a single thin sheet 112 positioned within a magazine and movable between a first or light obscuring or protective or threading position wherein it extends across the recess 12 in the magazine M and between it and its forwardly facing opening and a second or operative or running position wherein it is retracted to a position completely within the body of the magazine and frees the film for exposure to light and for engagement with a pull-down claw and, if desired, positioning claw. As shown, this single blade is disposed directly between the film and the forward edge of the film path but it may be placed in a flat pocket formed between a thin plate with an opening which defines the aperture and a portion of the wall of the magazine, this plate having a central portion offset from its edges for the reception of the blade and the edges being attached to the wall. As shown in Figure 3, however, I may prefer to guide this shutter by a depression or groove 113 stamped or otherwise formed in the cover of the magazine and a depression or groove 114 similarly formed opposite thereto in the floor of the body of the magazine. A light trapping groove 113' serves also to guide gate member 14.

Figure 4:
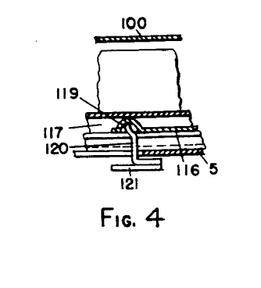
Figure 4 is a fragmentary section of a camera taken on the line 4—4 of Figure 7 with a magazine in position therein which shows control mechanism for operating my light-trap, of a single blade or tubular type.

To move this light obscuring blade, I prefer to attach to the upper end thereof or form therewith a right-angled extension 115 which after passing between an edge of the film track and the adjacent or bottom wall of the magazine is attached to or formed integrally with an upwardly extending slide 116 working in and guided by a depression or channel not shown formed in the floor of the film magazine. As its extreme point, this slide carries a control cup, or driven motion transmitting member 119, which when the magazine is within the camera embraces an upstanding pin 120 attached to a control slide 121 which extends from and is attached to latching slide 76 which is operated by control button 79. This pin may be made slightly resilient to accommodate slight irregularities in the magazine caused by manufacturing or use. This pin works in a slot 121 cut in the floor 5 of the magazine receiving compartment. As is clear from Figures 4 and 8 this slide works between and may be held by parallel walls 5 and 6, or, alternatively, straps, not shown, may be provided, this slide and these plates being parallel. Hence movement of this latch will operate the light-trap.

Figures 10, 11, 12, 13, 14, 15, 16, 17, 20:
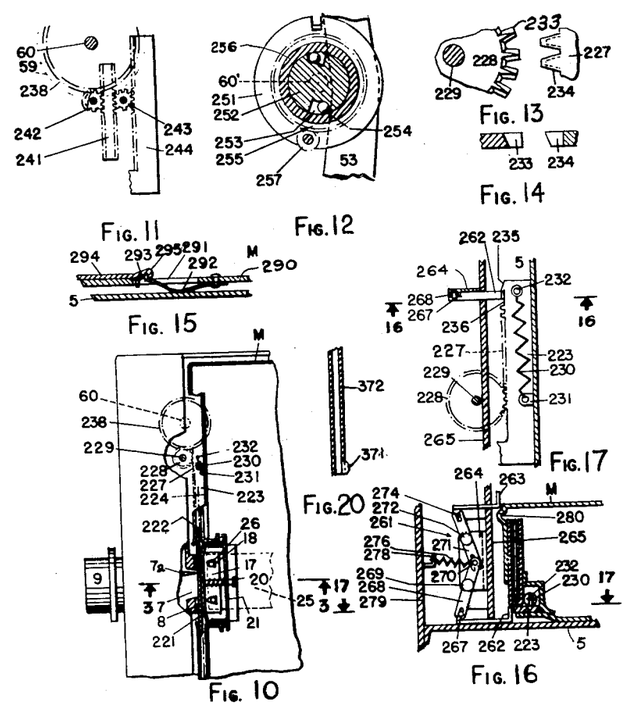
Figure 10 is a vertical sectional view through a camera showing my novel gate, a light trap of my single-bladed type, and rack and pinion control mechanism for operating either this light trap or one of my tubular type.
Figure 11 is an enlarged detailed sectional view of control mechanism of my rack and pinion type, but compounded.
Figure 12 is an enlarged detailed view, largely in section, of a one-way clutch which I may apply to control mechanism for a light trap which is operated by an actuating member for a pull-down or other feeding member of a camera only when a feeding movement is started.
Figure 13 is an enlarged plan view of a preferred construction of rack and pinion.
Figure 14 is a fragmentary sectional view corresponding to Figure 14.
Figure 15 is a detail of one form of latch for holding a light trap in open position, this latch being mounted upon a magazine and movable to running position by the insertion of a magazine into a camera by the starting button thereof and released for return to protective position by the first portion of the movement of the magazine out of the camera.
Figure 16 is an enlarged sectional view, taken on the line 16—16 of Figure 17 and looking in the direction of the arrows, which illustrates a latch for a light trap which I employ with the control mechanism which is actuated by a control button of a camera.
Figure 17 is a section taken on the line 17—17 of Figure 16 and looking in the direction of the arrows.
Figure 20 is a fragmentary view of a device shown as attached to a tubular light-trap for moving a gate section away from a light trap.

The light-trap just described is illustrated in Figures 2, 3 and 10. A modification is shown in Figure 22 of my parent patent.

The operation of this light-trap according to this phase of this invention is clear from the immediately foregoing portion of this specification. A user by a movement in a direction normal to the optical axis places a magazine, such as has been described, in its compartment 3, manually closes the cover and by an upward movement of latching button 79 latches it shut. This latching operation moves slide 121 upwardly thereby moving pin 120 upwardly in slot 122. As the magazine has been placed in the compartment pin 120 has entered cup 119. This operation moves light trapping blade 112 from obscuring or protective relation to magazine opening 111 and frees the film for exposure and feeding. During this operation the movable gate section 14 remains motionless. After the light-trap, however, has been moved upwardly clear of the opening, pins 26 move forwardly within openings 18 finally engaging their forward ends 19 and thereupon move the portion of the gate section which is carried by the magazine into closed or running position. Therefore, it will be seen that this latching movement of the cover will be effective first to open the light-trap and thereafter to close the gate. As section 14 presses against the film f it moves it toward fixed gate section 8 and into engagement therewith, thus slightly displacing the film from its straight path between delivery mouth 106 and take-up mouth 107, the operational path therefore being disposed slightly forwardly or toward the lens from the threading path shown in Figures 2 and 3. This same latching movement has likewise moved control plate 71 upwardly thereby freeing the pull-down so that it can be operated by its control button. If a careless user tries to start the feeding operation immediately, projection 55 continues to block dog 50 which is sufficiently elongated to remain in alignment until the light-trap has cleared the path of both claws.

Contrary movement of latch 79 from the latched to the unlatched position which is prerequisite to the opening of the cover will first be effective for opening the gate by drawing plate 14 away from fixed apertured section 8 and will thereafter move the light-trap from exposure position back to protective position and will block the pull-down. Sequence is enforced so that there can be no conflict.

The control mechanism which is claimed herein may be employed with gate structures other than those which I use as illustrations herein, including those described and claimed or described in my parent patent.

It will be understood by those skilled in this art that all surfaces engaging an image-bearing portion of the film are suitably relieved to prevent scratching.

It will also be understood that by "closed recess" as used in this description and in the claims, I mean an area which is enclosed upon all sides which affect the film. The inner side—that is the one adjacent the floor of the magazine and generally in alignment with the floor of the magazine—is necessarily open in part to receive the parts of the gate and its mechanism which are carried by the apparatus. For convenience, I have shown the various members which form the recess as in contact, but as a matter of fact they are somewhat loose fitting since relatively free movement is desirable. Light is baffled for the most part, by angular formations. In connection with these and related parts, I use the work "plates." This term does not imply weight or bulk, for almost all of these parts are made of light but stiff sheet metal.

The previous detailed portions of this specification have described a light-trap of my novel single bladed type as being moved between protective and running positions by interlocked relation with a latch for a cover. Also, the light-traps of this application may be operated directly by the cover, as described and claimed in the said parent application of my parent Patent Number 2,391,497, dated December 25, 1945, of Oliver Whitwell Wilson and myself. As previously stated such a control mechanism can be applied equally well to my novel tubular light-trap. I shall now first describe another type of control mechanism for a light-trap and first apply such mechanism to a light-trap of a single bladed type although it is equally applicable to either form or to a conventional light-trap.

Control mechanism for a light-trap, which I am about to describe, is actuated to move a light-trap from protective to running position by the starting of the feed of the camera. The light-trap thereupon is moved back to protective position from such running position either by the stopping of the operation of the feed of the camera or preferably by the removal of the magazine from its compartment within a camera.

As previously described, I may attach to the upper portion of a light-trap formed by a single blade 221 as shown in Figure 10 by an offset connection or right angled extension 222 of a slide 223, these parts corresponding to those previously described in connection with Figure 2 and indicated by reference characters 112, 115 and 116 respectively.

This slide works in a guiding depression 224. In this upwardly extending slide teeth 227 are cut for cooperation with teeth of a driving pinion 228 revoluable upon a short shaft 229. The rack so formed extends forwardly below the lower edge of the film and is exposed along the front face of the magazine for engagement by pinion 228. This pinion and the rack driven thereby correspond in operation to the pin and cup construction previously described. A spring 230 extending between a bracket 231 in the side of guiding depression 224 and a pin 232 extending from this slide tend to move the slide downwardly and hence to move the light-trap from free or running position to protective or threading position. See Figure 17.

In order to prevent a possible conflict between the teeth of the rack and those of the pinion when the magazine is placed in operative relation with the camera and these teeth first engage, the teeth 233 and 234 of pinion or rack, respectively, or of both may be bevelled at the cooperating edges as is shown in fragmentary enlarged detail in Figures 13 and 14. Alternatively the rack bar may be so mounted that it is capable of a slight resilient inward movement toward the center of the film compartment as the magazine is placed in the compartment which receives it. The light obscuring shutter or blade, its offset portion and the slide or rack may all be formed of one piece, as will be readily apparent. Such movement may be supplied by making the shutter which is operated by the rack bar of resilient metal or alternatively by connecting the rack bar and the shutter or light-trap which it operates by a leaf spring. Very little movement is all that is required, if any. As will best be understood by reference to Figure 17 and for coaction with a latch later to be described in detail, I may prefer to form the upper portion of this slide or rack bar with a fixed latching head 235 separated from the teeth of the rack bar by a small flat 236.

Figure 9:
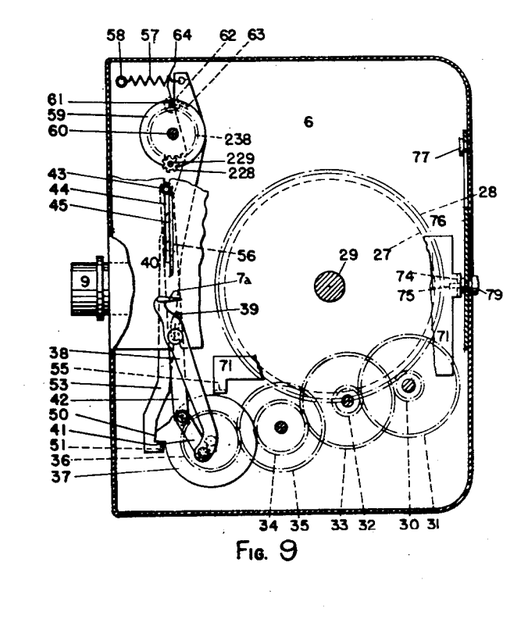
Figure 9 is a vertical sectional view of a mechanism chamber of a camera. It supplements Figure 8 by showing a pull-down and the mechanism which drives and controls it and differs therefrom in that it shows a pinion and rack characteristic of this invention for operating a light trap. This mechanism is shown as controlled at least in one operative movement by an actuating member which starts and stops the pull-down.

As is shown in Figures 9 and 10 movement is communicated to pinion 228 by gear 238 attached to shaft 60 and rotatable therewith and with disc 59 following movement of strut 61 by control button 62, as has been previously described. As gear 238 is so rotated pinion 228 is also rotated to drive rack 227 to move the light obstructing blade of the trap from protective to running position. Such movement also rocks the top of control lever 53 backwardly or toward the right as shown in Figures 9 and 12 thereby removing dog 51 from projection 50 and starting a feeding operation. It will be understood that while movement is immediately communicated to the trap so that its lower end clears the position to be occupied by the claws movement is not communicated to these claws until the dog and projection are completely separated. Thus, there is no conflict between claws and light-trap even in the relatively simple form of the invention shown in Figure 10.

I prefer, however, to provide mechanism which relatively very quickly completes this retraction of the light-trap. To that end, as is shown in Figure 11, I compound this movement. I drive an intermediate toothed rack 241 by a pinion 242 corresponding to pinion 228 and similarly driven. This rack drives a pinion 243 which engages a toothed rack 244 generally corresponding to that previously described, rack 241 having teeth formed on its sides adjacent both pinions. It will therefore be understood that this construction much increases the speed of movement of the light-trap from protective to running position.

As previously stated, I may mount my single bladed light-trap out of direct contact with the film in a guiding socket or pocket between the film and the front of the magazine, but for simplicity I am showing this single bladed light-trap as positioned adjacent the film and guided by the previously described depressions in the magazine cover and floor.

According to the construction just described, the light-trap is placed in light obscuring or protecting relation to the film every time the exposure of the film is stopped and removed therefrom every time the exposing operation is started, whether or not the magazine is removed from the camera. This arrangement ordinarily calls for many movements and the passage of the light-trapping element between the fixed gate section and the film between each "shot." The gate structure previously described has sufficient resilience to permit such movement without harm. To avoid such movement, however, I much prefer to move the light-trap to running position as described above but then to latch it in that open position until the magazine is removed from the camera, the act of such removal being effective automatically to release such latch and thereupon to permit spring 230 to return the light-trap to protective position.

To this end I transmit the motion of control button 62 only in one direction—namely that of starting the operation of the apparatus—by a one-way clutch of the familiar ball and wedge type. As is shown in Figure 12, a control disc 251 is attached to shaft 60. Coaxial with disc 251 and movable therewith is a control disc 252 into which two wedge shaped openings 253 are cut, balls 254 being placed therein. A collar 256 retains the balls. Attached to and driven by this disc or formed therewith is a gear 255 which meshes with a pinion 257 corresponding to pinions 228 and 242 previously described. By reason of this construction it will be evident that the motion of control disc 251 will be communicated to the light-trap only when the control button is moved to start the apparatus and disc 252 rotated in a clockwise direction, contrary movement to stop the feed having no effect upon gear 255 and hence upon the light-trap.

In order to latch the light-trap in running or free position after it has been moved thereto as described above, I may employ the latch of Figures 16 and 17 or that of Figure 15.

The latch of Figures 16 and 17, which is generally indicated as 261, consists essentially of a retaining pin 262, a releasing pin 263 and spring operated linkage connecting the two, all mounted directly or indirectly upon a supporting plate 264 which extends forwardly from a portion 265 of a front wall of a magazine receiving compartment. Retaining pin 262 is L-shaped, the long leg of the L sliding upon floor 5 of the magazine receiving compartment and the short upstanding leg being adapted to cooperate with a locking tooth or latch 235 which as previously described is formed in the upper end of rack 223. After the mechanism previously described has been operated by the movement of the control button to feeding position, latch 235 and retaining pin 262 are moved together and locked in position to hold the light-trap open and in running position.

Retaining pin 262 by pin and slot connection indicated as 267 is attached to and operated by link 268 pivoted at 269 to plate 264. This link likewise by pin and slot connection 270 is connected to and operated by a link 271 likewise pivoted by a pin 272 to plate 264. By another pin and slot connection 274 link 271 is attached to L-shaped releasing pin 263 for operation therewith. Means not shown are provided to guide members 262 and 263. A spring 276 extending from pin 270 to a bracket 278 conveniently placed in a portion 279 of the front wall of a camera tends to pull the center point of this linkage forwardly and the retaining and releasing pins backwardly or into latching position. A camming formation 280 is placed on a forward upper edge of a cover of a magazine M.

By reason of the above construction it will be evident that after a magazine has been placed in position and control button 62 moved to start a feeding operation locking tooth 235 upon slide 223 will press locking pin 262 forwardly against pressure of coiled spring 276 which will thereupon lock these two members in latching engagement with each other. As control button 62 is moved in counter clockwise direction to stop the feeding operation, this movement will not be communicated to the rack because of the one-way clutch of Figure 12. When, however, the magazine is removed from its compartment camming surface 280 will engage releasing pin 263 and through the several pin and slot connections immediately move locking pin 262 forwardly and away from engagement with locking tooth 235 thereby permitting spring 230 immediately to snap the light-trap to protective position. Spring 276 will return the latch to the position of Figure 15 ready for further operation. It will, of course, be understood that at this time the gate will necessarily be opened by the unlatching of the magazine cover and the feeding mechanism locked motionless.

Alternatively, I may make use of a latching structure such as that which is shown in Figure 15. A bottom wall 290 of a magazine such as M or M' is formed with a small suitably light-trapped opening 291 across which extends a latching leaf spring 292 formed with a retaining head 293. In the right hand extremity of rack 294, which except as to this latching mechanism corresponds to rack 244 previously described, a cooperating latching or retaining head 295 is formed.

By reason of this construction it will be evident that when the magazine is placed in the apparatus retaining or latching head 295 will be positioned for engagement by retaining head 293. As soon as rack 294 is moved to operative position by the mechanism previously described in connection with toothed rack 244 these members will snap together and the rack will be held until the removal of the magazine from its compartment removes the tension from spring 292 and thereby disengages the cooperating formations 293 and 295 thereby permitting a spring such as 230 immediately to snap the light-trap to protective position. I place this structure in the bottom wall of the magazine so that the ligh-trap will be snapped to protective position upon the first portion of the movement of the magazine from its receptacle. It will be understood that if all features of my invention have been utilized at this time the gate will have been opened. As appears herein, however, this phase of my invention may be used entirely independently of any control of the gate by an operator.

As stated in the introductory portion of this specification and in the detailed description previously presented, I may utilize the same mechanism for operating either my single bladed light-trap previously described or my tubular or double bladed light-trap which I am about to describe or a conventional light-trap. My tubular light-trap, however, is particularly but not exclusively applicable to a magazine and camera of the Morsbach type wherein a film extends across a recess. If my invention is to be used in its entirety, I support and critically position a presser member by mechanism carried by a camera. In case a single bladed light-trap is used, I may employ my novel magazine which is characterized by a closed recess as claimed per se in my parent patent which itself protects the back of the film from light. If I use the Morsbach-Ford magazine which is characterized by an open recess and I provide a light-trap which completely surrounds the section of film which is exposed across the recess when the magazine is out of a camera. In the second case a presser member preferably is mounted upon a camera upon or adjacent the forward edge of a movable gate bracket in such relation to a film receiving compartment that when a magazine is positioned therein it extends into the open recess and between the film and the body of the magazine and is disposed opposite a backwardly facing apertured gate member. When the light trapping tube which is necessary with such a gate is in a first or protective or threading position it is disposed across the gate receiving recess of the magazine and completely surrounds the film. It is then withdrawn from this protective relation to the film to a second or running or exposing position wherein it is disposed within the body of the magazine.

As previously made clear the film is held during its exposure exactly in the focal plane of the lens as is necessary for proper results. It is so held by mechanism which is critically positioned by the apparatus. An apertured member which establishes and closely maintains this plane therefore must project backwardly from the lens and into contact with the film. It is evident that this tubular member which for light-trapping purposes must completely surround the film must be so disposed that it does not conflict at any time with an apertured member which defines the focal plane nor with a presser member which holds the film thereagainst. Moreover it should be made impossible for a careless user to start a feeding movement while the light-trap lies across the recess opposite the feeding members. Means to accomplish the latter of these ends have already been described.

I prefer to prevent this conflict by spacing the magazine so that the length of film stretching across the open recess and surrounded by the light-trap is disposed sufficiently to the rear of a fixed gate section so that when the light-trap is in position it clears the fixed gate section. The movable gate section is disposed a still greater distance to the rear and between the light-trapping tube and the back of the recess. Thereupon, after the light-trap has been removed from protective position, the gate closing operation causes a presser member to bring the film forwardly toward the lens and into engagement with the fixed gate member. When the light-trap is again returned to closed position it moves the film backwardly a few thousandths of an inch as is necessary to permit this clearance when the magazine with the light-trap in position is removed. It will be seen, therefore, that the operational path of a film through the camera is moved slightly forwardly toward the lens from a straight line between the mouths of the channels which lead the film from and to the gate receiving recess. The threading path of the film, however, is a straight line extending between opposite mouths of the delivery and take-up channels respectively and surrounded by the tubular light-trap.

As previously stated I apply this structure to a magazine M' of the Morsbach type. Further details of this magazine will be observed from the said Morsbach Patent 2,175,538, Figure 6 thereof.

As shown in Figures 5, 6 and 7 hereof in a front wall 300 of a magazine M' an open recess 301 is provided over which a film f passes. As will be seen from Figure 8 a movable gate or presser member 80 already described is resiliently mounted upon the forward upturned end of a movable gate bracket 25. Spacing members 302 may extend forwardly from the magazine to engage the front wall of the compartment 3 to hold the magazine slightly away therefrom so that the light-trap will clear the backwardly facing apertured gate section 8 when the magazine is in position in the camera. Alternatively similar spacing formations 93 already described may extend backwardly from the front wall of the magazine-receiving compartment of the camera. This spacing of the forward portion of the magazine away from the front wall of the compartment is slight and not at all critical. All that is necessary is to afford the above noted clearance between light-trap and fixed gate section, the final and critical positioning always depending upon members disposed upon and wholly controlled by the apparatus.

A delivery channel 303 leads from a delivery mass of the film not shown to the gate receiving recess and terminates in a delivery mouth 304 having a slightly flared front edge 305 so as to cause no conflict with the film as it is brought forwardly into engagement with the fixed gate section of the camera. A similar take-up channel 306 aligned with channel 305 having a take-up mouth 307 likewise slightly flared at 308 leads from this recess toward the take-up mass not shown, this channel being adapted to receive the lower portion of my tubular light-trap. The rear wall of both channels is formed by a single plate 309 which forms the back wall 310 of the recess and extends upwardly and downwardly from points adjacent the forward portion of the recess. Extending upwardly from plate 309 toward the top or delivery side of the magazine is a supporting and baffling plate 311 which cooperates with the upper portion of plate 309 to furnish a part of the housing for the control mechanism for the light-trap, later described. Upon the backward side of this plate is supported a film tensioning arm 312 in the form of a flat leaf spring to furnish tension control according to the Bundick and Proctor system.

A consideration of Figures 5, 6, 7, 18, 18A, 19 and 20 will make clear the construction of my tubular light-trap. A cup 313 is formed in a slide 314 working in a depression or channel 315 shaped like an inverted U formed by a small baffle plate 315' extending between the floor of the magazine and the upwardly extending portion of plate 309. A right angled offset portion 316 of the slide is attached to (or formed with) and moves a tubular member or sleeve 317 which completely surrounds the film f and furnishes a light-trap. This tubular member preferably is formed with U-shaped depressions 318 and 319 in its top and bottom portions respectively and is guided by corresponding and cooperating U-shaped depressions 320 and 320' stamped in the top and bottom surfaces of the cover 322 and bottom wall 323 respectively of the magazine.

These depressions may be of the shape shown in Figure 3. Alternatively and preferably, such configurations may be reversed with the openings of the respective U-shaped formations being disposed toward the edges of the film slide.

Cup 333 is substantially as long as the width of the film in order to give a greater bearing surface for the control member which enters therein in order to operate the slide. This control member resembles pin 120 but is much longer. As before this cup is mounted upon the end of a slide 334 offset at 336 and attached to the main tubular portion 337 of the light-trap. The edges of this tube are continued in the form of flat edge guides 338 and 339 which bound the top and bottom edges of an exposure opening 341 and terminate in a short supporting tube 344. In operation, the movable gate member 89 works through this opening 341. At this time the film is moved forwardly out of contact with the central portions of these edge guides but the portions adjacent the tubes continue to guide the film. Thus, it will be seen that a somewhat more rigid structure is provided and both edge guides are furnished by the light-trap itself.

Figures 18A, 19:
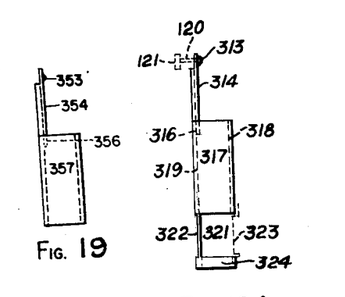
Figure 18A is a form alternative to that of Figure 18.
Figure 19 corresponds to Figure 18 and illustrates another modification of my tubular light trap.

Figure 19 illustrates a simpler form of light-trapping tube which is similar in one respect to the light-trap of Figures 2 and 3. In this instance the supporting short tube 344 and the edge guide or guides connecting it with the main tube are completely omitted. As will be clear from Figure 18 a light-trapping tube 357 is provided similar to tube 337. This tube is supported by an offset portion 356 of a slide 354 which terminates in a cup 353 corresponding to cup 313 previously described. In all respects the operation of this light-trap is the same as that previously mentioned except that edge guides and the supporting tube below the main tube are omitted. In this instance an edge guide such as shown in the said Morsbach Patent 2,175,538 as 12 disposed upon the floor of the magazine receiving compartment and an edge guide 134 formed in the cover of the magazine may well be used. This light-trap is of course guided in the manner previously described for the single bladed light-trap 111 as can best be seen in Figure 3. The light-trap with the film disposed therewithin moves from take-up channel 306 to delivery channel 303 being guided by grooves corresponding to 113 and 114 as shown in that figure. In view of its great simplility for many purposes I prefer this form of tubular edge guide.

With such a structure, I may use edge guides and control means therefor, articulated with the control mechanism hereof, such as described and claimed in the patents to Proctor 1,944,037 and 1,944,033 both dated January 16, 1934. Alternatively, I may dispense with edge guides altogether as for a camera which is to be sold cheaply and not used for critical photography.

As previously made clear, any of the means for controlling a single bladed light-trap as previously described herein may be applied to this tubular light-trap. This is to say, cup 313 as the magazine is placed in position within the camera immediately embraces operating pin 120 mounted upon control arm 121 providing the structure of Figure 8 is utilized as is preferred for many purposes. Alternatively, however, cup 333 may be used with an elongated pin such as described in connection therewith. If, however, it is desired to control the light-trap in accordance with the mechanism previously described in combination with the control button, I may form slide 314 and those constructed similarly thereto, namely slides 334 and 354, in accordance with the construction shown in Figures 10, 11, 15 and 17. In these cases the movement of control button 62 to cover-latching or running position will serve to withdraw the light-trap from protective to running position by coaction between pinions and a rack formed in the slide as previously described. Contrary movement as previously described may be afforded by movement of the control button to stop the film or preferably by removal of the magazine from the apparatus in accordance with the latching mechanism of Figures 15, 16 and 17. In the former case it will be understood that I move this tubular member through the gate while it is closed between each "shot." To accommodate the light-trap under these conditions I may supply sufficient resilient movement of the movable gate or presser member 89 so that the needed separation of the plates can take place. In the construction of Figure 20, however, in order to cam the presser member away from the fixed gate member I place a camming surface 371 upon the lower edge of a tubular light trapping member 372 of the sort shown in Figures 19, and also 5, 6, 7 and 18. By reason of this construction the gate members will be separated sufficiently easily to permit the light-trap to move between them. It will be readily understood by those skilled in this art that such a cam may be applied to a single bladed light-trap. It forms an important part of this invention.

The advantages of my invention will be clear from the above portion of this specification, the drawings attached hereto and made a part hereof, and the subjoined claims. These advantages include the provision of an improved control for light-traps of a magazine and improved construction of light-traps in combination therewith.

I claim:

1. In a film camera, in combination, a removable film magazine comprising a front wall provided with two parallel slits normal to the side wall of said magazine enabling exit and entry of the film moving between said slits, a receding wall portion between said slits, and at least one sleeve-shaped film guiding member adapted to slide through said slits into and out of said magazine in the longitudinal direction of the film moving between said slits and to form a light-tight enclosing tube between said slits, a slidable pressure plate arranged behind the film in said recess, an apertured plate arranged in front of said film and cooperating with said pressure plate, an intermittently moving film member engaging said film when it is not enclosed by said tube, and means operable by an operator of the camera and adapted to move said sleeve-shaped tubular film guiding member and said pressure plate and to start and stop said film in timed relation.

2. In a film camera, in combination, a removable film magazine comprising a front wall provided with two parallel slits normal to the side wall of said magazine enabling exit and entry of the film moving between said slits, a receding wall portion between said slits, and at least one sleeve-shaped film guiding member adapted to slide through said slit into and out of said magazine in a longitudinal direction of the film moving between said slits and to form a light-tight enclosing tube for the free film portion between said slits, a slidable pressure plate arranged in front of said film and cooperating with said pressure plate, and an intermittent film moving member engaging said film when it is not enclosed by said tubular enclosing member, a cover for enclosing said magazine when it is disposed within said camera, a member associated with the closing and opening of said camera cover, means cooperating with said member associated with said camera closing and opening means, said means being adapted to move said sleeve-shaped film guiding member and said movable pressure plate and to start and stop said film claw at the will of the operator of the camera, in such manner that the film portion between said slits is enclosed against light at the time when said pressure plate is moved out of contact with the free film portion and said film moving member is stopped, and vice versa.

3. In a film camera in combination, a removable film magazine comprising a front wall provided with a light admitting opening, a tubular sleeve-shaped member movable between a position opposite said opening and one spaced therefrom, means for moving said member between said positions, a film passing from a delivery coil through said member to a take-up coil, a slidable pressure plate arranged behind the film opposite said opening, means for moving said pressure plate toward and away from the film, an aperture plate arranged in front of said pressure plate, a film claw engaging the film at a point at which it is not enclosed by said tubular member, means for starting and stopping said claw, and control mechanism including instrumentalities operatively engaging said means for moving said tubular member, said means for moving said plate and said means for starting and stopping said claw and effective for operating each thereof.

4. In a film-handling apparatus, in combination, an apertured magazine, a compartment in said apparatus for the reception of said magazine, a light trap for a film disposed within said magazine and movable between a protective position across the aperture of said magazine and a running position free of said aperture, a motion-receiving connection for operating said light trap, a pull-down for a film housed within said magazine when said magazine is within said compartment, control mechanism for starting said pull-down for exposing the film and for stopping it after such exposure, and a motion transmitting connection between said control mechanism and the motion-receiving connection of said light trap when said magazine is within said compartment for moving said light trap in timed relation to the operation of said control mechanism.

5. In a film handling apparatus, in combination, a magazine-receiving compartment, means for feeding a film housed within a magazine when said magazine is within said compartment, said magazine having an aperture, a light trap for the film being disposed within said magazine, said light trap being movable from and to a protective position across said aperture, said light trap having an operating connection, control mechanism for starting said feeding means for exposing the film and for stopping it after such exposure, and an operating connection attached to said control mechanism and engageable with said connection of said light trap when said magazine is within said compartment for causing the movement of said light trap from protective position in timed relation to the starting of said exposure and for causing its movement back to protective position in timed relation to the stopping of such exposure.

6. In a film handling apparatus, a magazine-receiving compartment, a light-trap for the film being disposed within said magazine, said light trap having a motion-receiving connection by which it is moved from and to protective position, a pull-down for engaging a film within said magazine when said magazine is within said compartment for feeding it, mechanism for driving said pull-down, a control button disposed upon the exterior of said apparatus, linkage between said control button and said mechanism for starting and stopping the operation of said pull-down by the movement of said control button, and a motion-transmitting connection operated by said linkage and engageable with said motion-receiving connection of said light-trap when said magazine is mounted within said magazine for moving said light-trap from and to protective position in accordance with the movement of said control button whereby said light-trap is moved from protective position in timed relation to the operation of said button to start said pull-down and to protective position in timed relation to the movement of said control button to the operation of said button to stop said pull-down.

7. In a film handling apparatus, an outside casing, a magazine-receiving compartment within said casing, a magazine for use therein being provided with an operable light-trap, said light-trap having a motion-receiving connection by which it is moved from and to protective position, a pull-down engageable with a film within the magazine when it is disposed within said compartment for advancing the film through said apparatus, means for starting and stopping the operation of said pull-down, said means including a control button disposed on the outside of said casing and linkage between said button and said pull-down, a motion transmitting connection engageable with said motion-receiving connection of said light-trap for operating said light-trap, and a connection between said motion-transmitting connection and said linkage for operating said light-trap by the movement of said linkage whereby said light-trap is moved from protective position in timed relation to the starting of said pull-down.

8. In a film handling apparatus, a magazine-receiving compartment, a magazine for use within said compartment being provided with a light-trap, said light-trap having a motion-receiving connection for operating it, a pull-down for advancing the film within said magazine when the magazine is within said compartment, means for starting and stopping said pull-down, and a motion-transmitting connection between said starting and stopping means and said motion-receiving connection of said light-trap in said magazine and engageable therewith when said magazine is within said compartment, said motion-transmitting connection including instrumentalities which move said light-trap from protective relation to the film in timed relation to the starting of said pull-down and are without effect upon said motion-receiving connection when said pull-down is stopped.

9. In a film handling device having a film chamber therewithin having an aperture, a light-trap for a film within said chamber, said light-trap being movable from and to a protective position across said aperture, and control mechanism for starting said feeding means for exposing the film and for stopping it after such exposure; in combination, a motion-transmitting train operatively connecting said control mechanism and said light-trap for positively moving said light-trap from protected position in timed relation to the starting of said exposure, said train including a lost motion device for rendering it ineffective upon said light-trap when said control mechanism is operated to stop said feeding means.

10. In a film handling apparatus, a magazine-receiving compartment, a light-trap for the film being disposed within said magazine, said light-trap having a motion-receiving connection by which it is moved from and to protective position, a pull-down for engaging and feeding a film within said magazine when said magazine is within said compartment, mechanism for driving said pull-down, a control button disposed upon the exterior of said apparatus, linkage between said control button and said mechanism for starting the operation of said pull-down by the movement of said control button in one direction and stopping said operation by the movement of said control button in the other direction, and a motion-transmitting connection operated by said linkage and engageable by said motion-receiving connection of said light-trap when said magazine is mounted within said compartment for moving said light-trap from and to protective position in accordance with the movement of said control button alternatively to start and stop the movement of said pull-down respectively, said motion-transmitting connection having a direct motion-transmitting instrumentality effective when said control button is moved in said direction to start the operation of said pull-down and having a lost motion device effective when said control button is moved in said other direction to stop the operation of said pull-down, whereby said light-trap is moved from protective position in timed relation to the operation of said button to start said pull-down but when said control button is moved to stop the operation of said pull-down said light-trap is unaffected.

11. In a film handling apparatus, an outer casing, a magazine-receiving compartment, a magazine for use within said compartment being provided with a light-trap, said light-trap having a toothed motion-receiving connection for operating it, a pull-down for advancing the film within said magazine when the magazine is within said compartment, a control button mounted upon the exterior of said casing, linkage between said control button and said pull-down for starting and stopping the operation of said pull-down, a pinion engageable with said toothed motion-receiving connection of said light-trap of said magazine when said magazine is disposed within said compartment for operating said light-trap, and a connection between said control button and said pinion for rotating said pinion in one direction when said control button is moved in one direction to operate said linkage to start said pull-down for moving said light-trap from protective position, said connection having a lost motion device which renders it ineffective to rotate said pinion in the opposite direction to move said light-trap back to protective position when said control button is moved in the opposite direction to stop the operation of said pull-down.

12. In a film handling apparatus, an outer casing, a magazine-receiving compartment within said casing, a magazine for use within said compartment being provided with a light-trap, said light-trap having a toothed motion-receiving connection for operating it, a pull-down for advancing the film within said magazine when the magazine is within said compartment, a control button disposed upon the exterior of said casing, linkage between said control button and said pull-down for starting and stopping said pull-down, said linkage including a toothed motion-transmitting member operated by said linkage and so positioned as to engage said toothed motion-receiving connection of said light-trap when said magazine is disposed within said compartment, the movement of said control button thereby operating said toothed connections to move said light-trap from protective position in timed relation to the starting of operation of said pull-down and to move it back into protective position in timed relation to the stopping of such movement after such exposure.

13. In a film handling apparatus, a lens, an outer enclosing casing, a magazine-receiving compartment within said casing, a cover for said compartment, a latch embodying a control button disposed upon the exterior of said casing for said cover, said magazine having an aperture in a wall thereof and including a light-trap movable from and to a protective position in relation to the aperture and embodying a motion-receiving connection, a pull-down for advancing a film housed within said magazine when said magazine is disposed in said compartment, a drive for said pull-down, a motor for operating said drive, a pull-down control button mounted upon the exterior of said casing, a first linkage between said pull-down control button and said drive for said pull-down for starting and stopping said drive upon the movement of said control button, a second linkage between said latch control button and said drive for said pull-down for blocking the operation of said first linkage when said latch control button is in unlatched position, a motion-transmitting connection between said first linkage and said motion-receiving connection of said light-trap engageable therewith when said magazine is within said compartment for operating said light-trap by the movement of said first linkage whereby said light-trap is moved from and to light-trapping relation with the film in timed relation to the starting and stopping respectively of said pull-down, means effective when said magazine is within said compartment for bringing the film into the focal plane of said lens, and a connection between said second linkage and said plane determining means for operating said plane determining means by movement of said control button, whereby a feeding operation on the film cannot be started until the film has been brought into the focal plane of said lens and the light-trap moved from protective position.

14. In a film magazine, two gate sections between which a film passes, one of said gate sections being resiliently movable in relation to the other thereof and one of said gate sections being apertured, said magazine having an aperture aligned with the aperture of said gate section, a light-trap for protecting the film from light at said aperture, said light-trap being movable from and to protective position between the film and said aperture and between said apertured gate section and the other of said gate sections, a cam formation, and an operating formation therefor, one of said formations being mounted on said light-trap and the other of said formations being mounted upon said movable gate section and engageable with said other formation as said light-trap is operated for moving said movable gate section away from said other gate section and the film between said gate sections so that said light-trap readily may pass between said gate sections.

15. In a film magazine, two gate sections between which a film passes, one of said gate sections being resiliently movable in relation to the other thereof and one of said gate sections being apertured, said magazine having an aperture aligned with the aperture of said gate section, a light-trap for protecting the film from light at said aperture, said light trap being movable from and to protective position between the film and said aperture and between said apertured gate section and the other of said gate sections, and a cam movable therewith and engageable with said movable gate section for moving it away from said other gate section and the film between said gate sections so that said light-trap readily may pass between said gate sections.

16. In a film magazine, two gate sections between which a film passes, one of said gate sections being movable in relation to the other thereof and one of said gate sections being apertured, said magazine having an aperture aligned with the aperture of said gate section, a light-trap for protecting the film from light at said aperture, said light-trap being movable from and to protective position between the film and said aperture and between said apertured gate section and the other of said gate sections, and means connecting said light-trap and said movable gate section for moving said movable gate section away from said other section so that said light-trap readily may pass between said gate sections.

17. In a film magazine, two gate sections between which a film passes, one of said gate sections being resiliently movable in relation to the other thereof and one of said gate sections being apertured, said magazine having an aperture aligned with the aperture of said gate section, a light-trap for protecting the film from light at said aperture, means including a motion-receiving formation for moving said light-trap from and to protective position between the film and said aperture and between said apertured gate section and the other of said gate sections, and connections between said motion-receiving formation and said movable gate section for moving said movable gate section away from said fixed gate section while said light-trap is passing therethrough and causing the resilience of said movable gate section to move said gate sections into close relation after said light-trap has passed therebetween.

18. In a removable film magazine for interchangeable use within a plurality of film handling apparatus and having side walls held in spaced parallelism by edge walls and one of said edge walls being apertured, a light-trap movable from and to protective position across said aperture for protecting a film from light passing therethrough, a spring for moving said light-trap from one of said positions to the other thereof, and a latch having both holding and releasing formations and mounted upon said magazine for bodily movement therewith for locking said light-trap in said position to which it has been so moved, said latch including a detent member movable with said light-trap and mounted upon said magazine therewithin, a holding member likewise mounted upon said magazine and operatively engageable with said detent member after said light-trap has been moved to said last mentioned position, and a releasing formation for said holding member operable from without said magazine.

19. In a film magazine having side walls held in spaced parallelism by edge walls one of which is apertured, a light-trap movable between a protective position across said aperture wherein it prevents light from reaching the interior of said magazine and a running position wherein light may enter said magazine; in combination means for moving said light-trap from one of said positions to the other thereof, and a releasable latch for locking said light-trap into the position to which it has been moved, said latch including two detents one connected to and movable with said moving means and the other normally aligned therewith and adapted to engage said first mentioned detent after said moving means have been operated thereby operating said latch for locking said light-trap and having a formation by which it is adapted thereafter to be moved out of said engagement thereby breaking the connection between said detents and releasing said latch.

20. In combination with a film magazine having side walls held in spaced parallelism by edge walls one of which is apertured, a light-trap movable between a protective position across said aperture wherein it prevents light from reaching the interior of said magazine and a running position wherein light may enter said magazine; means for moving said light-trap from a first of said positions to a second thereof, a spring for moving said light-trap from the second of said positions back to the first thereof, and a releasable latch for locking said light-trap in said second position against the power of said spring, said latch including two separate detents one connected to and movable with said moving means and the other normally aligned therewith and being adapted to engage said first mentioned detent upon such movement thereby operating said latch to lock said light-trap in said position, said second detent being movable for releasing said first detent thereby releasing said latch upon movement away from said first detent.

21. In a film handling device according to claim 8, said device having a spring against which said connection moves said light-trap out of protective position into an open position and a latch for locking said light-trap in an open position to which it has been moved against the power of said spring, said latch including a holding member operatively engageable with said light-trap after it has been moved to said running position and a releasing member for said holding member operable from without said magazine.

22. In combination, a film magazine and a film handling apparatus within which it is employed, said film magazine having side walls one of which is apertured held in spaced parallelism by edge walls, a light-trap movable from and to protective position across said aperture for protecting a film from light passing therethrough; means for moving said light-trap from a first of said positions to a second thereof, said means including a motion-receiving instrumentality positioned upon said magazine and a motion-transmitting instrumentality permanently positioned upon said apparatus, a spring for moving said light-trap from said second back to said first position, and an operable latch for locking said light-trap in said second position against the power of said spring, said latch comprising a detent formation permanently mounted upon said magazine and a releasing formation permanently mounted upon said apparatus, said instrumentalities and said formations being so positioned and disposed that they are brought into engagement by the placing of said magazine upon said apparatus.

23. In a film magazine, said magazine having side walls held in spaced parallelism by edge walls and one of said edge walls being apertured, one of said edge walls having an operating protuberance, a light-trap movable from and to protective position across said aperture for protecting a film from light passing therethrough, a spring for moving said light-trap from one of said positions to the other thereof, an operable latch permanently mounted upon said magazine for bodily movement therewith engageable from the exterior of said magazine for locking said light-trap in said position from which it has been so moved, said latch including a holding formation within said magazine and a separate releasing formation engageable from the outside of said magazine for releasing said latch so that said spring moves said light-trap to the other of said positions, and a motion-receiving formation separate from said latch and operably connected with said light-trap and engageable from the exterior of said magazine for moving said light-trap against the power of said spring and into engagement with said latch, said protuberance being effective to operate an operating connection to said releasing formation.

24. In a film magazine for use in a film handling apparatus, said magazine having side walls held in spaced parallelism by edge walls one of which is apertured, a light-trap movable between a protective position wherein it prevents light from reaching a film in said magazine through said aperture and a running position wherein it permits the exposure or projection of the film, a spring for moving said light-trap from one of said positions to the other thereof, a slide mounted within said magazine and disposed adjacent one of the walls of said magazine and including a motion-receiving formation engageable from without said magazine and also embodying a detent member of a latch, said spring being attached to said slide, and a connection between said slide and said light-trap, said detent member of said latch being so disposed that it is engageable from without said magazine by a member upon said apparatus operable for successively engaging and locking said detent and hence said light-trap and for withdrawal therefrom thereby freeing said detent and said light-trap.

25. In a film magazine for use in a film handling apparatus, said magazine having side walls held in spaced parallelism by edge walls one of which is apertured, a light-trap movable between a protective position wherein it prevents light from reaching a film in said magazine through said aperture and a running position wherein it permits the exposure or projection of the film, a spring for moving said light-trap from one of said positions to the other thereof, an operating slide disposed adjacent one of the walls of said magazine, with one portion formed into a toothed rack engageable with a pinion disposed upon said apparatus and another portion formed into a detent member of a latch, said spring being attached to said slide, and a connection between said slide and said light-trap, said detent member of said latch being engageable from without said magazine by a releasing instrumentality upon said apparatus operable for successively engaging and locking said detent and for withdrawal therefrom thereby freeing said detent.

26. In a film magazine for use in a film handling apparatus, said apparatus having a magazine-receiving compartment; and said magazine having side walls held in spaced parallelism by edge walls one of which is apertured, a light-trap movable between a protective position wherein it prevents light from reaching a film within said magazine through said aperture and a running position wherein it permits the exposure or projection of the film, a spring for moving said light-trap from one of said positions to the other thereof, a motion-receiving connection attached to said light-trap for moving it against the power of said spring, said connection being engageable from without said magazine, and a latch for locking said light-trap in the position to which it has been moved against the power of said spring, said latch including one detent member movable with said light-trap and another member in the form of a leaf spring having a tooth thereupon for engagement with the detent member when said light-trap is disposed in one of said positions, said leaf spring being so disposed and shaped that when said magazine is disposed in said compartment it is moved into alignment under tension with said detent member thereby locking said light-trap in place and when said magazine is removed therefrom it springs away from said detent member thereby releasing it and breaking said latch.

27. In a film magazine having side walls held in spaced parallelism by edge walls and one of said edge walls being apertured, a light-trap movable from and to protective position across the aperture for protecting a film from light passing therethrough, a spring for moving said light-trap from one of said positions to the other thereof, a motion-receiving formation mounted upon said magazine and accessible from without said magazine for moving said light-trap against the power of said spring, and a detent or locking formation separate from said motion-receiving formation mounted upon said magazine and movable with said light-trap and formed and adapted to be engaged from without said magazine when said spring is extended for locking said light-trap in open position when so engaged.

28. In a film magazine having side walls held in spaced parallelism by edge walls and one of said edge walls being apertured, a light-trap movable from and to protective position across said aperture for protecting a film from light passing therethrough, a spring for moving said light-trap from one of said positions to the other thereof, and means for moving said light-trap from the other of said positions to the first mentioned thereof, said means including a toothed rack within said magazine engageable from without said magazine and movable against the power of said spring for moving said light-trap from protective to running position when so engaged and operated, and a detent or latching head also engageable from without said magazine and movable with and operatively connected to said toothed rack for holding said light-trap in said open position after it has been so moved thereto and has been so engaged.

29. In a film magazine adapted for use with a film handling apparatus; said film handling apparatus having a magazine-receiving compartment and operating mechanism mounted upon said apparatus and including a latch member and a release member extending within said compartment; said film magazine having side walls held in spaced parallelism by edge walls and one of said edge walls being apertured, a light-trap movable from and to protective position across said aperture for protecting a film from light passing therethrough, means connected to said light-trap for moving it between said positions, a detent formation connected to said light-trap and engageable with said latch member of said apparatus for locking said light-trap in the position to which it has been moved when said magazine is introduced into said compartment, and a formation in one of said walls of said magazine so positioned that it is engageable with said releasing member of said apparatus by the act of moving said magazine from said compartment and effective through said operating mechanism for withdrawing said latch member from said detent.

30. In combination, a film handling apparatus and a magazine for use therewith; said apparatus having a magazine-receiving compartment, a latching member extending therewithin, a releasing member separate from said latching member extending therewithin, and a connection whereby said releasing member withdraws said latching member from holding position, said members and said connection being mounted upon said apparatus for bodily movement therewith; said magazine having side walls held in spaced parallelism by edge walls and one of said edge walls being apertured, a light-trap movable from and to protective position across said aperture and protecting a film from light passing therethrough, a detent formation so positioned that it is engageable with said latching member of said apparatus by the act of placing said magazine within said compartment, and a releasing member in one of said walls of said magazine and engageable with said releasing formation of said apparatus for withdrawing said latching member of the apparatus from contact with said detent of said magazine by the act of removing said magazine from said compartment.

31. In a film handling apparatus adapted for the reception of a magazine; said magazine having an irregular surface formation upon the exterior of one of its walls, a light-trap therewithin, and mechanism including a detent for latching said light-trap in a predetermined position; said apparatus having a magazine receiving compartment, a latch member extending within said compartment for operative engagement with said detent, a releasing formation extending within said compartment and so positioned that it is operable by said irregular surface formation upon a wall of said magazine when said magazine is removed from said compartment, and an operating connection between said releasing formation and said latch member for withdrawing said latch member from said detent by the act of withdrawing said magazine from said compartment as said irregular surface formation engages and operates said releasing formation.

32. In a film handling apparatus adapted for the reception of a magazine; said magazine having therewithin a light-trap, a detent operatively connected within said magazine with said light-trap which when operative holds it in a predetermined position, and an irregular surface formation upon the exterior of a wall of said magazine; said apparatus having a magazine receiving compartment, a latch member extending within said compartment for engagement with said detent of said magazine, a releasing formation extending within said compartment and so positioned that it is operable by said irregular surface formation upon a wall of said magazine as it is being removed from said compartment, and a toggle spring connecting said releasing formation and said latch member for quickly withdrawing said latch member from said detent when said magazine is so withdrawn from said compartment.

33. In a combination of a film handling apparatus and a film-containing magazine; said magazine having side walls held in spaced parallelism by edge walls one of which is apertured, and a light-trap movable between a protective position wherein it covers the aperture to prevent light passing therethrough and a running position wherein said aperture is free; said apparatus having a compartment for the reception of said magazine and a pull-down for feeding the film across said aperture when said magazine is in said compartment; operable motion-transmitting coacting members mounted upon said apparatus with one thereof extending within said compartment for moving said light-trap from said protective position to said running position, mechanism mounted upon said apparatus for operating said motion-transmitting members, and mechanism independent of said members and mounted within said magazine for moving said light-trap back to said running position and including instrumentalities so disposed as to be made operable by the act of removal of said magazine from said compartment.

34. In a film handling apparatus, in combination, a film-containing magazine one wall of which is formed with a light-admitting aperture, a light-trap for the film within said magazine movable between a protective position across said aperture and a running position free thereof, a spring urging said light-trap to said protective position, a compartment within said apparatus for the reception of said magazine, a pull-down for feeding a film housed within the magazine when the magazine is disposed within said compartment, control mechanism for starting said feeding means for exposing the film and for stopping it after said exposure, linkage between said control mechanism and said light-trap for moving said light-trap from protective position in timed relation to the starting of said feeding means, a latch for holding said light-trap in running position after it has so moved thereto against the power of said spring, and releasing mechanism including formations in part upon said magazine and in part upon said apparatus for releasing said latch upon the removal of said magazine from said compartment.

35. In the combination of a film handling apparatus and a film-containing magazine, said magazine having side walls held in spaced parallelism by edge walls one of which is apertured, and a light-trap movable between a protective position wherein it covers the aperture to prevent light passing therethrough and a running position wherein said aperture is freed, said apparatus having a compartment for the reception of said magazine and a pull-down for feeding the film across said aperture when said magazine is in said compartment; operable motion-transmitting linkage mounted within said apparatus engaging said light-trap when said magazine is within said compartment which when operated positively moves said light-trap from one of said positions to the other thereof, control means mounted upon said apparatus for so operating said linkage, and operating formations one of which is disposed upon said magazine and bodily movable therewith and another of which formations is disposed within said apparatus and connected to said linkage, said formations being so positioned as to be operable by the bodily movement of said magazine in relation to said compartment for operating said linkage to cause the movement of said light-trap back to the position from which it had been originally moved by the operation of said linkage.

36. In a film handling device having two gate sections between which a film passes, one of said gate sections being resiliently movable in relation to the other thereof, and one of said gate sections being apertured, a light-trap for protecting the film from light at said aperture, and means for moving said light-trap from and to protective position between the film and said aperture and between said apertured gate section and the other of said gate sections; a cam formation and an operating formation therefor, one of said formations being mounted on said light-trap and movable therewith and the other of said formations being mounted upon said movable gate section and engageable with said other formation as said light-trap is operated for moving said movable gate section away from said other gate section and a film between said gate sections so that said light-trap may readily pass between said gate sections.

37. In a film handling device, a gate comprising an apertured section and a presser section, means for moving said presser section from and to a running position adjacent said apertured section and in engagement with a film disposed between it and said apertured section, a light-trap movable between a protective position between said gate sections wherein it protects the film from light entering through said aperture and a running position free of said gate plates, operating means for moving said gate section between said protective and running positions, and a formation movable with said operating means for moving said presser section away from said apertured section so that said light-trap may readily pass therebetween.

38. In a film handling device, two gate sections between which a film passes, one of said gate sections being resiliently movable in relation to the other thereof and one of said gate sections being apertured, said magazine having an aperture aligned with the aperture of said gate section, a light-trap for protecting the film from light at said aperture, said light-trap being movable from and to protective position between the film and said aperture and between said apertured gate section and the other of said gate sections, and a formation mounted for movement with said light-trap for engaging said resiliently movable gate section and moving it away from said other gate section so that said light-trap readily may pass between said gate sections.

39. In a film handling device, two gate sections between which a film passes, one of said gate sections being movable in relation to the other thereof and one of said gate sections being apertured, said magazine having an aperture aligned with the aperture of said apertured gate section, a light-trap for protecting the film from light at said aperture, said light-trap being movable from and to protective position between the film and said aperture and between said apertured gate section and the other of said gate sections, and means connecting said light-trap and said movable gate section for moving said movable gate section away from said other section so that said light-trap readily may pass between said gate sections.

40. In a film handling device, two gate sections between which a film passes, one of said gate sections being resiliently movable in relation to the other thereof and one of said gate sections being apertured, said magazine having an aperture aligned with the aperture of said gate section, a light-trap for protecting the film from light at said aperture, means including a motion-receiving formation for moving said light-trap from and to protective position between the film and said aperture and between said apertured gate section and the other of said gate sections, and connections between said motion-receiving formation and said movable gate section for moving said movable gate section away from said fixed gate section while said light-trap is passing between said sections and causing the resilience of said movable gate section to move said gate sections into close relation after said light-trap has passed therebetween.

41. In a film handling device, an apertured gate section, a presser gate section for holding a film against said apertured section, a spring for moving said presser section toward said apertured section and a film therebetween, a light-trap having a path of movement between said gate sections to a protective position wherein it protects the film from light passing through said aperture and a running position free of said aperture wherein said spring presses the film against said apertured section, and a cam mounted for movement with said light-trap and engageable with a portion of said presser plate for camming said presser plate away from said apertured plate to permit the ready passage of said light-trap between said gate plates, the range of movement of said cam because of its position in relation to said light-trap being such that it clears said gate section except just before and while said light-trap passes therethrough.

42. In a film magazine having side walls held in spaced parallelism by edge walls and one of said edge walls being apertured, a light-trap movable from and to protective position across said aperture for protecting a film from light passing therethrough, an operating member connected to said light-trap for moving it between said positions, a spring attached to said operating member for moving said operating member so that said light-trap is moved thereby from one of said positions to the other thereof, a detent separate from said operating member mounted upon said magazine for bodily movement therewith and operative movement in relation thereto for locking said light-trap in said position to which it has been so moved against the power of said spring, and a motion-receiving formation embodied within said operating member by which it and said light-trap may be moved against the power of said spring into operative engagement with said detent.

43. In a film magazine having side walls held in spaced parallelism by edge walls one of which is apertured and a light-trap movable between a protective position across said aperture wherein it prevents light from reaching the interior of said magazine and a running position free from the aperture wherein light may enter said magazine; in combination, a member connected to said light-trap for moving said light-trap from one of said positions to the other thereof, and a latch including two detent members, both of said detent members being mounted upon said magazine for bodily movement therewith and one of said detent members being relatively fixed and the other of said detent members being movable with said light-trap, said detent members including cooperating formations which when engaged following the movement of said relatively movable member lock said light-trap in the position to which it has been moved.

WARREN DUNHAM FOSTER.

REFERENCES CITED

The following references are of record in the file of this patent:

UNITED STATES PATENTS

| Number | Name | Date |
|---|---|---|
| 2,143,769 | Fairbanks | Jan. 10, 1939 |
| 2,293,195 | Cohen | Aug. 18, 1942 |

FOREIGN PATENTS

| Number | Country | Date |
|---|---|---|
| 147,603 | Great Britain | July 8, 1920 |
| 834,548 | France | Nov. 23, 1948 |
| 889,261 | France | Jan. 5, 1944 |